United States Patent
La Plante

(10) Patent No.: US 10,726,703 B1
(45) Date of Patent: Jul. 28, 2020

(54) PHONE PROXIMITY ALARM SYSTEM

(71) Applicant: Norman La Plante, N Las Vegas, NV (US)

(72) Inventor: Norman La Plante, N Las Vegas, NV (US)

( * ) Notice: Subject to any disclaimer, the term of this patent is extended or adjusted under 35 U.S.C. 154(b) by 0 days.

(21) Appl. No.: 16/552,618

(22) Filed: Aug. 27, 2019

(51) Int. Cl.
G08B 21/14 (2006.01)
G08B 21/24 (2006.01)
H04W 4/02 (2018.01)

(52) U.S. Cl.
CPC ............ *G08B 21/24* (2013.01); *H04W 4/023* (2013.01)

(58) Field of Classification Search
CPC .. H04M 1/6066; G08B 21/14; G08B 13/1427
USPC ............ 455/41.2, 411; 379/414; 340/539.23, 340/686.6, 539.11
See application file for complete search history.

(56) References Cited

U.S. PATENT DOCUMENTS

| | | | | |
|---|---|---|---|---|
| 7,535,357 B2 * | 5/2009 | Enitan | ................ | G08B 13/1427 340/539.11 |
| 7,898,414 B2 | 3/2011 | Soano | | |
| 8,130,116 B1 | 3/2012 | Daigle | | |
| 8,467,770 B1 * | 6/2013 | Ben Ayed | ............. | H04L 63/107 455/411 |
| 8,750,797 B2 * | 6/2014 | Ketari | ................ | G08B 13/1427 455/41.2 |
| 8,836,507 B2 | 9/2014 | Thielman | | |
| 9,437,091 B2 | 9/2016 | Jenkins | | |
| 9,993,166 B1 * | 6/2018 | Johnson | ............... | A61B 5/0205 |
| 9,999,744 B2 * | 6/2018 | Proud | .................. | A61B 5/4812 |
| 10,004,451 B1 * | 6/2018 | Proud | .................. | A61M 21/02 |
| 10,058,290 B1 * | 8/2018 | Proud | .................. | A61B 5/0022 |
| 2001/0002211 A1 * | 5/2001 | Lee | ..................... | H04M 1/6066 379/414 |
| 2002/0113705 A1 | 8/2002 | Wallace | | |
| 2007/0096933 A1 * | 5/2007 | Enitan | ..................... | G08B 21/24 340/686.6 |
| 2007/0109120 A1 * | 5/2007 | Schaefer | ................ | G08B 21/24 340/539.23 |
| 2007/0279219 A1 * | 12/2007 | Warriner | ................ | G07C 11/00 340/539.23 |
| 2010/0019920 A1 * | 1/2010 | Ketari | ..................... | G08B 21/24 340/686.6 |
| 2016/0174841 A1 * | 6/2016 | Proud | .................. | A61B 5/4806 600/476 |
| 2016/0174894 A1 * | 6/2016 | Proud | .................... | A61B 5/113 600/301 |

(Continued)

FOREIGN PATENT DOCUMENTS

WO    WO03007257    1/2003

*Primary Examiner* — William D Cumming

(57) ABSTRACT

A phone proximity alarm system for inhibiting a user from losing an electronic device includes an electronic device that has an electronic memory. The electronic memory stores location software which has the capability of setting a trigger distance for the electronic device. An alarm unit is provided and the alarm unit is carried by a user of the electronic device. The alarm unit is in electrical communication with the electronic device and the electronic device broadcasts a tracking signal to the alarm unit. The alarm unit is turned on to emit an audible alarm when the strength of the tracking signal falls below a pre-determined threshold. In this way the alarm unit audibly alerts a user that the user is a risk of losing the electronic device.

6 Claims, 2 Drawing Sheets

(56) References Cited

U.S. PATENT DOCUMENTS

| | | | | |
|---|---|---|---|---|
| 2016/0183870 A1* | 6/2016 | Proud | ................... | A61B 5/1118 |
| | | | | 600/595 |
| 2016/0249854 A1* | 9/2016 | Proud | .................. | A61B 5/4848 |
| | | | | 600/595 |
| 2016/0317781 A1* | 11/2016 | Proud | .................. | A61B 5/4812 |
| 2019/0282098 A1* | 9/2019 | Proud | .................. | A61B 5/4806 |

* cited by examiner

PHONE PROXIMITY ALARM SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to proximity devices and more particularly pertains to a new proximity device for inhibiting a user from losing an electronic device.

(2) Description of Related Art Including Information Disclosed Under 37 CFR 1.97 and 1.98

The prior art relates to proximity devices.

BRIEF SUMMARY OF THE INVENTION

An embodiment of the disclosure meets the needs presented above by generally comprising an electronic device that has an electronic memory. The electronic memory stores location software which has the capability of setting a trigger distance for the electronic device. An alarm unit is provided and the alarm unit is carried by a user of the electronic device. The alarm unit is in electrical communication with the electronic device and the electronic device broadcasts a tracking signal to the alarm unit. The alarm unit is turned on to emit an audible alarm when the strength of the tracking signal falls below a pre-determined threshold. In this way the alarm unit audibly alerts a user that the user is a risk of losing the electronic device.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
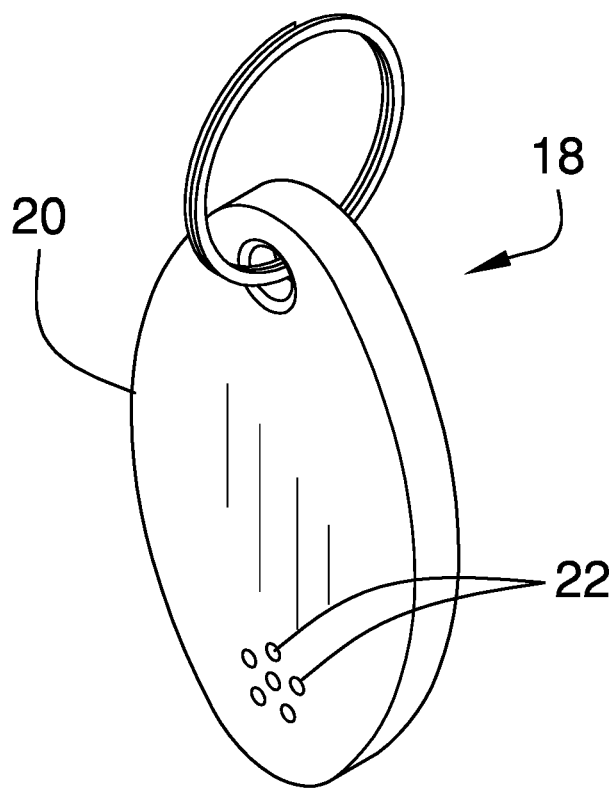
FIG. 1 is a back perspective view of an alarm unit of a phone proximity alarm system according to an embodiment of the disclosure.
Figure 2:
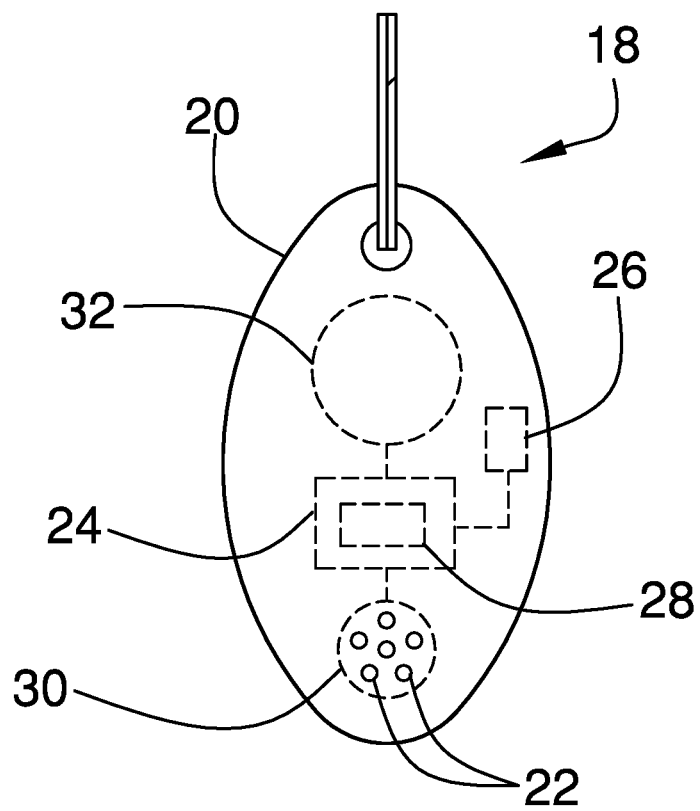
FIG. 2 is a back phantom view of an alarm unit of embodiment of the disclosure.
Figure 3:
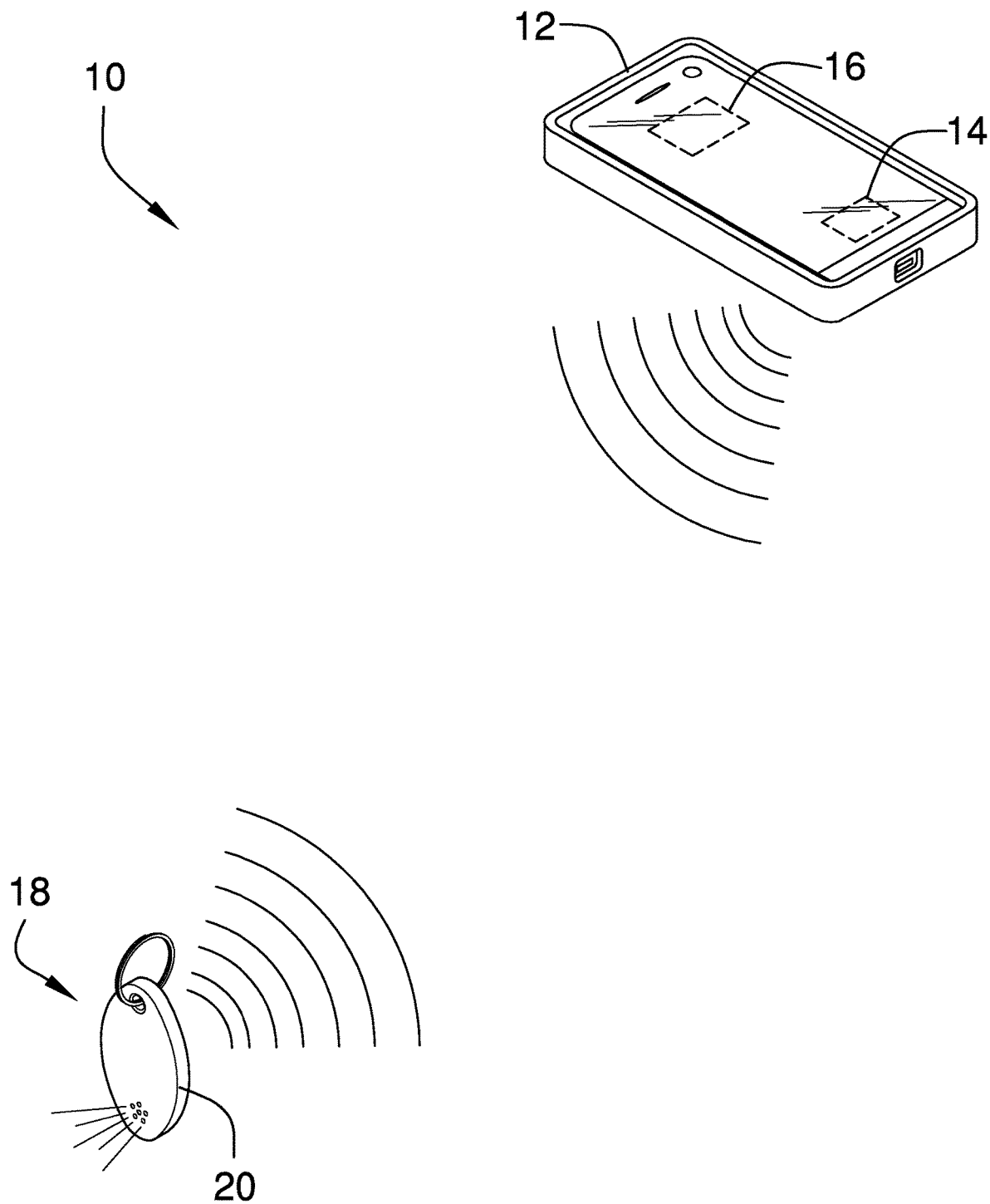
FIG. 3 is a perspective in-use view of an embodiment of the disclosure.

With reference now to the drawings, and in particular to FIGS. 1 through 3 thereof, a new proximity devices embodying the principles and concepts of an embodiment of the disclosure and generally designated by the reference numeral 10 will be described.

As best illustrated in FIGS. 1 through 3, the phone proximity alarm system 10 generally comprises an electronic device 12 that has a first transceiver 14 and an electronic memory 16. The electronic memory 16 stores location software which has the capability of setting a trigger distance for the electronic device 12. The trigger distance may be a distance ranging between approximately 1.0 meter and 10.0 meters. The electronic device 12 may be a smart phone or other personal electronic device 12 that has wireless communication capabilities. The first transceiver 14 may be a radio frequency transceiver or the like.

An alarm unit 18 is provided and the alarm unit 18 is carried by a user of the electronic device 12. The alarm unit 18 is in electrical communication with the electronic device 12 and the electronic device 12 broadcasts a tracking signal to the alarm unit 18. The alarm unit 18 is turned on to emit an audible alarm with the strength of the tracking signal falls below a pre-determined threshold. In this way the alarm unit 18 can audibly alert a user that the user is at risk of losing the electronic device 12.

The alarm unit 18 comprises a housing 20 that is carried by the user. The housing 20 has a speaker opening 22 extending into an interior of the housing 20. The housing 20 may comprise a key fob or the like that can be attached to a key ring or the like. A control circuit 24 is positioned within the housing 20 and the control circuit 24 receives an alert input.

A second transceiver 26 is positioned within the housing 20 and the second transceiver 26 is electrically coupled to the control circuit 24. The second transceiver 26 is in wireless electrical communication with the first transceiver 14. The first transceiver 14 broadcasts a tracking signal to the second transceiver 26 and the second transceiver 26 receives the trigger distance from the first transceiver 14. The second transceiver 26 may be a radio frequency transceiver or the like.

A signal analyzer 28 is positioned within the housing 20 and the signal analyzer 28 is electrically coupled to the control circuit 24. The signal analyzer 28 receives the tracking signal from the second transceiver 26 thereby facilitating the signal analyzer 28 to determine the distance between the first transceiver 14 and the second transceiver 26. Moreover, the control circuit 24 receives the alert input when the signal analyzer 28 determines that the signal strength of the tracking signal falls below a signal strength corresponding to the trigger distance. The signal analyzer 28 may be an electronic signal analyzer that is capable of determining the distance that a radio frequency signal has traveled.

A speaker 30 is coupled to the housing 20 and the speaker 30 is electrically coupled to the control circuit 24. The speaker 30 is turned on when the control circuit 24 receives the alert input. In this way the speaker 30 can alert the user that the user is at risk of leaving the electronic device 12 behind. The speaker 30 is aligned with the speaker opening 22 in the housing 20. A power supply 32 is positioned within the housing 20, the power supply 32 is electrically coupled to the control circuit 24 and the power supply 32 comprises at least one battery.

In use, the user sets the trigger distance on the electronic device 12 in the location software. The first transceiver 14 broadcasts the tracking signal to the second transceiver 26 and the tracking signal is routed to the signal analyzer 28. Additionally, the trigger distance is communicated to the signal analyzer 28. The speaker 30 is turned on when the signal analyzer 28 determines that the housing 20 has been moved beyond the trigger distance from the electronic device 12. In this way the user is notified that the user is at risk of losing the electronic device 12 thereby facilitating the user to retrieve the electronic device 12.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A phone proximity alarm system for alerting a user if the user moves beyond a pre-determined distance from their phone, said system comprising:
an electronic device having an electronic memory, said electronic memory storing location software having the capability of setting a trigger distance for said electronic device, said electronic device including a first transceiver; and
an alarm unit, said alarm unit being carried by a user of said electronic device, said alarm unit being in communication with said electronic device, said electronic device broadcasting a tracking signal to said alarm unit, said alarm unit being turned on to emit an audible alarm when the strength of said tracking signal falls below a pre-determined threshold wherein said alarm unit is configured to audibly alert a user that the user is a risk of losing said electronic device, said alarm unit comprising
a housing being carried by the user, said housing having a speaker opening extending into an interior of said housing,
a control circuit being positioned within said housing, said control circuit receiving an alert input, and
a second transceiver being positioned within said housing, said second transceiver being electrically coupled to said control circuit, said second transceiver being in wireless communication with said first transceiver, said first transceiver broadcasting said tracking signal to said second transceiver, said second transceiver receiving said trigger distance from said first transceiver.

2. The system according to claim 1, wherein said alarm unit includes a signal analyzer being positioned within said housing, said signal analyzer being electrically coupled to said control circuit, said signal analyzer receiving said tracking signal from said second transceiver thereby facilitating said signal analyzer to determine the distance between said first transceiver and said second transceiver.

3. The system according to claim 2, wherein said control circuit receives said alert input when said signal analyzer determines that the signal strength of said tracking signal falls below a signal strength corresponding to said trigger distance.

4. The system according to claim 3, wherein said alarm unit includes a speaker being coupled to said housing, said speaker being electrically coupled to said control circuit, said speaker being turned on when said control circuit receives said alert input wherein said speaker is configured to alert the user that the user is at risk of leaving said electronic device behind, said speaker being aligned with said speaker opening in said housing.

5. The system according to claim 1, wherein said alarm unit includes a power supply being positioned within said housing, said power supply being electrically coupled to said control circuit, said power supply comprising at least one battery.

6. A phone proximity alarm system for alerting a user if the user moves beyond a pre-determined distance from their phone, said system comprising:
an electronic device having a first transceiver and an electronic memory, said electronic memory storing location software having the capability of setting a trigger distance for said electronic device; and
an alarm unit, said alarm unit being carried by a user of said electronic device, said alarm unit being in communication with said electronic device, said electronic device broadcasting a tracking signal to said alarm unit, said alarm unit being turned on to emit an audible alarm when the strength of said tracking signal falls below a pre-determined threshold wherein said alarm unit is configured to audibly alert a user that the user is a risk of losing said electronic device, said alarm unit comprising:
a housing being carried by the user, said housing having a speaker opening extending into an interior of said housing;
a control circuit being positioned within said housing, said control circuit receiving an alert input;

a second transceiver being positioned within said housing, said second transceiver being electrically coupled to said control circuit, said second transceiver being in wireless communication with said first transceiver, said first transceiver broadcasting a tracking signal to said second transceiver, said second transceiver receiving said trigger distance from said first transceiver;

a signal analyzer being positioned within said housing, said signal analyzer being electrically coupled to said control circuit, said signal analyzer receiving said tracking signal from said second transceiver thereby facilitating said signal analyzer to determine the distance between said first transceiver and said second transceiver, said control circuit receiving said alert input when said signal analyzer determines that the signal strength of said tracking signal falls below a signal strength corresponding to said trigger distance;

a speaker being coupled to said housing, said speaker being electrically coupled to said control circuit, said speaker being turned on when said control circuit receives said alert input wherein said speaker is configured to alert the user that the user is at risk of leaving said electronic device behind, said speaker being aligned with said speaker opening in said housing; and a power supply being positioned within said housing, said power supply being electrically coupled to said control circuit, said power supply comprising at least one battery.

\* \* \* \* \*